US005597653A

United States Patent [19]

Ikeda et al.

[11] Patent Number: 5,597,653

[45] Date of Patent: Jan. 28, 1997

[54] ANTITHEFT LABEL FOR USE ON OBJECTS AND AN ABSORPTIVE PAD HAVING SUCH AN ANTITHEFT LABEL FOR USE ON FOOD

[75] Inventors: Takashi Ikeda; Akira Homma, both of Kyoto, Japan

[73] Assignee: Unitika Ltd., Hyogo, Japan

[21] Appl. No.: 449,339

[22] Filed: May 24, 1995

Related U.S. Application Data

[62] Division of Ser. No. 186,470, Jan. 26, 1994, Pat. No. 5,496,611.

[30] Foreign Application Priority Data

| | | | |
|---|---|---|---|
| Jan. 27, 1993 | [JP] | Japan | 5-029637 |
| Oct. 27, 1993 | [JP] | Japan | 5-292787 |

[51] Int. Cl.[6] .......... B32B 9/04

[52] U.S. Cl. .......... 428/411.1; 428/81; 428/189; 428/192; 428/457; 428/599; 428/611; 428/615; 428/692; 428/900; 340/572

[58] Field of Search .......... 428/615, 358, 428/76, 174, 212, 192, 195, 352, 481, 486, 491, 304.4, 913, 914, 81, 189, 192, 457, 411.1, 594, 611, 615, 692, 950; 340/572

[56] References Cited

U.S. PATENT DOCUMENTS

| | | | |
|---|---|---|---|
| 3,938,125 | 2/1976 | Benassi | 340/280 |
| 4,484,184 | 11/1984 | Gregor et al. | 340/572 |
| 4,622,542 | 11/1986 | Weaver | 340/572 |
| 4,646,935 | 3/1987 | Ulam | 220/453 |
| 4,660,025 | 4/1987 | Humphrey | 340/572 |
| 4,686,516 | 8/1987 | Humphrey | 340/572 |
| 4,779,076 | 10/1988 | Weaver | 340/551 |
| 4,797,658 | 1/1989 | Humphrey | 340/551 |
| 4,960,651 | 10/1990 | Pettigrew et al. | 428/607 |
| 5,083,112 | 1/1992 | Piotrowski et al. | 340/572 |

OTHER PUBLICATIONS

Grant & Hackh's Chemical Dictionary, 5th ed., 1987, p. 242.

*Primary Examiner*—William A. Krynski
*Attorney, Agent, or Firm*—Sughrue, Mion, Zinn, Macpeak & Seas

[57] ABSTRACT

An antitheft label composed of a soft magnetic metal strip permanently applied to an electroconductive nonmagnetic metal member. The label is attached to an object to prevent the object from being stolen or taken without permission. An object, such as food goods, having such an antitheft label can be thawed or heated in a high-frequency heater such as a microwave oven without developing spark discharge at edges of the soft magnetic metal strip of the label, thereby preventing the occurrence of fire damage to the food product.

1 Claim, 1 Drawing Sheet

ANTITHEFT LABEL FOR USE ON OBJECTS AND AN ABSORPTIVE PAD HAVING SUCH AN ANTITHEFT LABEL FOR USE ON FOOD

This is a divisional of application Ser. No. 08/186,470 filed Jan. 26, 1994, now U.S. Pat. No. 5,496,611.

BACKGROUND OF THE INVENTION

The present invention relates to an antitheft label for use on objects, such as goods, books, computer diskettes, etc. for preventing such objects from being stolen from, for example, stores and libraries. The invention also relates to an absorptive pad for use on food that has such an antitheft label attached thereto for preventing food items from being stolen.

In general, cases of shoplifting at department stores and supermarkets are increasing in number year by year. The reduction in the size of computer disks, for example, is said to be one of the reasons for the recent increase in the number of cases where disks containing important information are stolen or taken without permission. To avoid this trouble, namely, for antitheft purposes, an antitheft label in the form of a soft magnetic metal strip is attached to an object, and is used together with a magnetic system that detects a change in magnetic field. Typically, the magnetic system is installed at h exit of the store or the place of storage in order to detect when an object is removed, thereby keeping an eye on the goods.

Antitheft labels for use in such magnetic detection systems include marks as described in "Amorphous Antitheft Marks" (U.S. Pat. Nos. 4,44,184 and RE32428) and goods surveillance markers as described in "Marker for Electronic Surveillance System and Electronic Goods Surveillance System To Be Operated with Such Marker" (U.S. Pat Nos. 4,660,025, 4,686,516, and 4,797,658).

An absorptive pad is conventionally used on food in order to absorb fluids which ooze from the food, for example, gravy and blood that drip from animal and fish meat. An example of a prior art absorptive pad for use on food is shown in FIG. 3. The absorptive pad as generally indicated by reference numeral 10 includes a short-fiber pulp sheet 8 that is sandwiched between an upper tape 6 and a lower tape 7, each of the tapes being formed of a polyethylene film. A plurality of holes 9 are formed in the lower tape 7 so that the gravy or blood from the food product is guided towards the pulp sheet 8. The absorptive pad 10 having this construction is usually placed in contact with the food at the bottom of the food tray.

A problem with such prior art antitheft labels is that the labels are visible and accessible to customers as the labels are usually attached to the outer side of the object. Thus, if one intends to steal an object, he needs only to select the object to which the antitheft label is not attached or from which the label has come off. Alternatively, the label can be deliberately removed from the item so that the object can be stolen without detection.

To solve these and other problems with the prior art, the antitheft label is attached to the inner side of the package of objects so that the label is not accessible to or seen from the outside.

Nevertheless, this practice causes other problems. For instance, frozen or cooked food sold on today's market is ready to eat by simply thawing or heating the food in the package in which it was purchased in a high-frequency heater, such as a microwave oven. However, during heating, spark discharge occurs at edges of the soft magnetic metal strip forming the antitheft label, thereby causing fire damage to the food.

If the antitheft label and the animal/fish meat, perishable food, or other food products which are to be protected from shoplifting are contained within the same package to insure that label will not be accessible to and visible from the outside, then the direct or indirect contact between the label and the food item will cause problems relating with food sanitation.

Further, placing the label inside of the package requires much labor and time on the part of the stores in that the antitheft labels must be attached to each of the containers or packages. Hence, it is desired to have a system in which the stores need only place the goods in a package which already has an antitheft label provided therein.

SUMMARY OF THE INVENTION

It is therefore a general object of the present invention to provide an antitheft label that can be attached to an item and which overcomes all of the problems associated with the prior art.

It is also an object of the present invention to provide an antitheft label for use with food products such that the food item can be thawed or heated in a high-frequency heater such as a microwave oven without causing spark discharge at edges of the antitheft label thereby preventing fire damage to the food item.

Another object of the present invention is to provide an absorptive pad with an antitheft label for use on food items that eliminates the labor and time which has heretofore been required to attach the label to the food items at stores, in which the label is not accessible to or capable of being seen from the outside; can be contained in the same package as the item without causing any problem relating to food sanitation; and can be placed in a high-frequency heater such as a microwave oven together with the item so that the item can be thawed or heated without developing spark discharge in the label that would otherwise cause fire damage to the item.

The present inventors conducted intensive studies in order to solve the aforementioned problems of the prior art and found that an antitheft label can be produced by permanently applying an electroconductive nonmagnetic metal member to a soft magnetic metal strip. Moreover, it was found that such a label when applied to food items permitted the item to be thawed or heated in a high-frequency heater such as a microwave oven without developing spark discharge at edges of the soft magnetic metal strip.

The present inventors also found that by attaching an antitheft label to an absorptive pad for use with food, the following advantages resulted. Namely, the labor and time which has heretofore been required to attach the label to products at stores are eliminated; the label is not accessible to or capable of being seen from the outside; the label can be placed in the same package as the food item without causing any problems relating to food sanitation; and the label can be placed in a high-frequency heater such as a microwave oven together with the item so that the food can be thawed or heated without developing spark discharge that would otherwise cause fire damage to the item.

In accordance with the above and other objects and advantages, the present invention provides an antitheft label that comprises an electroconductive nonmagnetic metal member permanently applied to a soft magnetic metal strip.

In further accordance with the above and other objects and advantages, the present invention provides a pad for absorbing fluids that ooze out of food, which pad has an antitheft label attached thereto that comprises an electroconductive nonmagnetic metal member permanently applied to a soft magnetic metal strip.

Even if the item to which the antitheft label according to the first aspect of the present invention is thawed or heated in a high-frequency heater such as a microwave oven, no spark discharge that would otherwise cause fire damage to the label or item will develop at edges of the soft magnetic metal strip in the label. In a preferred embodiment, the corners of the conductive nonmagnetic metal member may be shaped to a curvature radius of 0.3 mm or more, and this offers the advantage that even if the item is a small quantity of meat or frozen food, no spark discharge will develop in the strip and there will be no fire damage to the label or item. As another advantage, the absorptive pad to which the above-described antitheft label is attached may be thawed or heated in a high-frequency heater such as a microwave oven while it is contained in the same package as the item to be protected from stealing. No spark discharge will develop at edges of the soft magnetic metal strip in the label and this prevents fire damage from occurring in the label, the absorptive pad or the item to be protected. Since the label is attached within the pad, the labor and time that has heretofore been necessary for attachment of the label at stores is eliminated; at the same time, the label can be prevented from being seen from the outside or from being stripped deliberately from the pad. Further, the item and the label can be contained in the same package without causing any problems in association with food sanitation.

DETAILED DESCRIPTION OF THE INVENTION

Figure 1:
FIG. 1 is a plane view illustrating a preferred embodiment of an antitheft label according to the present invention.

The present invention will now be described with reference to the accompanying drawings.

The antitheft label according to a first aspect of the present invention includes an electroconductive nonmagnetic metal member permanently applied to a soft magnetic metal strip. This insures that when an item to which the label is attached is heated by high-frequency waves such as microwaves from a microwave oven, that the waves are reflected by the conductive nonmagnetic metal member or, alternatively, the conductive nonmagnetic metal member distributes the electric field around the soft magnetic metal strip throughout the conductive metal member, thereby averaging and reducing the field strength. As a result, the chance of the electric field of being concentrated at edges of the soft magnetic metal strip to develop spark discharge is completely eliminated or reduced by a significant degree. Furthermore, the sensitivity of the magnetic detection system to the soft magnetic metal strip in no way deteriorates even if the conductive nonmagnetic metal member is permanently applied to the strip.

According to the present invention, the conductive nonmagnetic metal member preferably has corners with a radius of curvature of at least 0.3 mm. The more preferred range is from 0.5 mm to 10 mm, with the range from 1 mm to 5 mm being particularly preferred. An antitheft label in which the conductive nonmagnetic metal member having corners with a radius of curvature of at least 0.3 mm and being permanently applied to the soft magnetic metal strip offers the advantage of utmost safety since frozen food such as chilled meat that has the label attached thereto can be thawed in a microwave oven without setting the label on fire even if the quantity of the food is considerably small. On the other hand, if the conductive nonmagnetic metal member has sharp corners with a curvature radius of less than 0.3 mm the microwaves tend to concentrate at the corners, thereby increasing the chance of the label catching fire.

The conductive nonmagnetic metal member has preferably an aspect ratio of 1:1 to 1:30, more preferably in the range from 1:1 to 1:15.

The conductive nonmagnetic metal member may be, for example, a conductive nonmagnetic metal foil or, alternatively, a conductive nonmagnetic thin metal sheet or film that is laminated on a synthetic resin film or some other suitable substrate. In order that these examples of the conductive nonmagnetic metal member do not block the magnetic characteristics of the soft magnetic metal strip, the thickness of the conductive nonmagnetic metal member is preferably in the range from 5 μm to 200 μm, with the range 7 to 50 μm being particularly preferred.

Any kind of conductive nonmagnetic metals may be used in the present invention but aluminum, copper, etc. are particularly preferred. Aluminum may be pure aluminum with a purity of least 99.5%; preferably, aluminum alloys containing at least one element such as copper, manganese, silicon, magnesium, nickel or zinc are to be used.

The soft magnetic metal strip used in accordance with the present invention may be composed of, for example, amorphous metals or permalloys; however, it is particularly preferred to use ferromagnetic amorphous metals that either generate higher-order harmonics in response to an incident magnetic field or exhibit permeabilities of at least $10^4$. It is desirable that these materials be composed of an alloy composition of at least one of iron and cobalt and at least one semimetal such as boron or silicon as the main ingredients. In this case, an additive such as nickel, molybdenum, vanadium, chromium or copper may be further contained. A particularly preferred alloy composition is $Fe_{77.5}Si_{7.5}B_{15}$, (the subscripts denoting atomic percent).

The soft magnetic metal strip to be used in the present invention may be an amorphous metal fiber, an amorphous thin metal sheet or an amorphous thin metal film as examples. These examples can be produced by various methods, such as melting a specified composition and rapidquenching it to solidify in a coolant in a rotating drum, rapidquenching the same on a chill surface such as a fast rotating cylinder or through a vacuum thin-film processes, which includes sputtering and ion beam bombardment.

The conductive nonmagnetic metal member can be permanently applied to the soft magnetic metal strip by various methods such as: securing the magnetic strip to the nonmagnetic metal member by means of an adhesive, a tackifier, etc.; covering the entire surface of the magnetic strip with the nonmagnetic metal member; or covering the magnetic strip with the combination of the nonmagnetic member and a third material, such as a synthetic resin film, or paper; other materials can of course be employed if they do not block the magnetic characteristics of the soft magnetic metal strip. Exemplary synthetic resin films include those of polyesters, polycarbonates, polyamides, polyurethanes, etc.

In the case where the soft magnetic metal strip is covered with the conductive nonmagnetic metal member or other materials, the mating coverings are preferably fused or fixed together by means of a tackifier, adhesive or the like to form a laminar structure or a bag. If the magnetic strip is covered with the nonmagnetic metal member, the two are preferably brought into direct contact without being spaced apart by means of an adhesive or the like. The magnetic strip may extend down to the edges of the covering material.

When using the antitheft label as described hereinabove a tackifier may be coated on one side of the label, which is then attached to a sheet of release paper so as to insure that the label can be readily attached to an item to be protected from stealing.

If desired, a magnetic material for deactivating the magnetic characteristics of the soft magnetic metal strip may be provided in a path along the strip.

According to a second aspect of the present invention, an absorptive pad for use on food is equipped with the above-described antitheft label, as explained below in detail.

Figure 3:
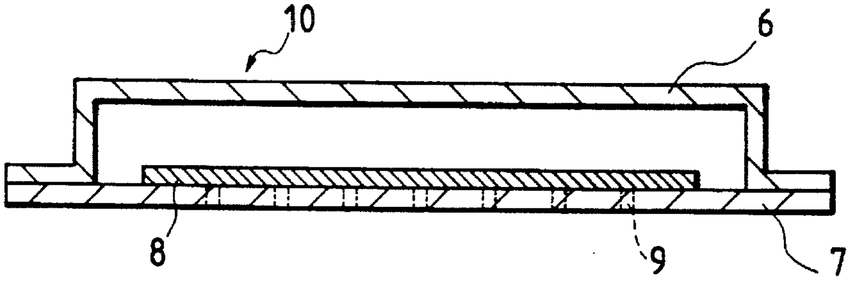
FIG. 3 PRIOR ART
FIG. 3 is a sectional view of a prior art absorptive pad for use on food.
Figure 4:
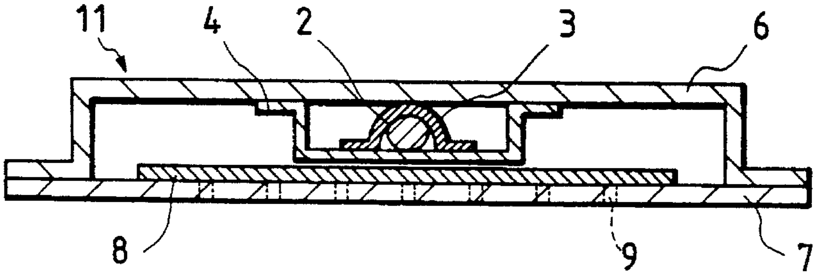
FIG. 4 is a sectional view of an absorptive pad with an antitheft label for use on food in accordance with a preferred embodiment of the present invention.

FIG. 4 is a sectional view showing an example of the absorptive pad including an antitheft label according to the present invention. As shown, a short-fiber pulp sheet 8 is sandwiched between an upper tape 6 and a lower tape 7. This arrangement is similar to the absorptive pad 10 used on food as shown in FIG. 3. However, the absorptive pad as shown in FIG. 4 further includes the antitheft label as described above in which a conductive nonmagnetic metal member 3 is permanently applied to a soft magnetic metal strip 2. The strip 2 is attached to the inner side of the upper tape 6 by means of a synthetic resin film 4. The absorptive pad 11 including the antitheft label constructed in this manner is suitable for use on food. As in the prior art absorptive pad 10, a plurality of holes 9 through which to guide gravy or blood in meat are made in the lower tape 7.

The antitheft label may be attached to the outer side of the upper tape 6. However, in this case, at least a portion of the label is visible to the outside even if the item to be protected from stealing is placed on top of the absorptive pad 11. It is, therefore, preferred to attach the label to the inner side of the upper tape 6 as shown in FIG. 4.

The upper and lower tapes 6 and 7 are preferably made of a synthetic resin film, in particular, a polyethylene film. The short-fiber pulp sheet 8 is preferably made from virgin pulp. The pulp may be prepared by the following procedure: softwood pulp or the like is ground mechanically and then processed to make cardboard, which is solidified as a sheet, followed by napping to provide enhanced water absorption.

To insure that both the soft magnetic metal strip 2 and the conductive nonmagnetic metal member 3 are covered completely with the synthetic resin film 4 when the label is attached to the upper tape 6, the length and width of the film 4 are preferably adjusted to be greater than those of the magnetic strip 2 and the nonmagnetic member 3.

If there is any possibility that the pad will make contact with food, even though indirect, the tackifier used is preferably selected from among those which are approved by governmental agencies, such as the U.S. Food and Drug Administration, or regulations such as the Japanese Food Sanitation Act. Specific preferred examples include emulsion-base PD-0681 and AP-6903 which are available from H. B. Fuller Co. U.S.A.

The absorptive pad 11 having the antitheft label may be constructed as follows.

First, a web of the upper tape 6 is coated with a hot-melt adhesive longitudinally over an area that is slightly larger than the width of the synthetic resin film 4 in the antitheft label. Thereafter, a plurality of antitheft labels are attached to the inner side of the upper tape 6 at appropriate spacings that permit one label to be provided for each absorptive pad. The antitheft labels are preferably attached in such a way that the conductive nonmagnetic metal member 3 is in contact with the upper tape 6.

The absorptive pad 11 has a plurality of holes 9 made in the lower tape 7 to provide paths for guiding gravy, blood in meat and the like to be absorbed by the pad. Hence, the label is preferably attached to the upper tape 6, rather than the lower tape 7, in order to avoid blocking the holes 9.

In the next step, a plurality of short-fiber pulp sheets 8 are arranged over the lower tape 7 at appropriate spacings that permit one pulp sheet to be provided for each absorptive pad.

The upper tape 6 is then superposed on the lower tape 7 in such a way that one of the antitheft labels and the short-fiber pulp sheets 8 are held by each absorptive pad. Lastly, each absorptive pad is heat sealed on four sides to yield a series of absorptive pads 11 which include the antitheft labels and which are suitable for use on food. Preferably, perforations are formed between adjacent absorptive pads 11 to insure that individual pads can easily be torn apart one by one.

The following examples and comparative examples are provided for the purpose of further illustrating the present invention, but are in no way to be viewed as limitations of the present invention.

EXAMPLES 1 TO 16

Figure 2:
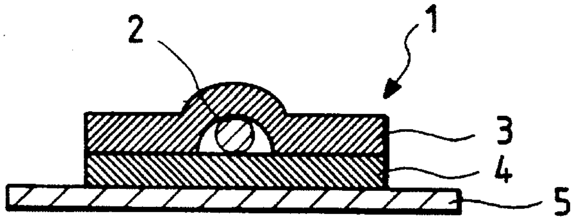
FIG. 2 is a section of the antitheft label shown in FIG. 1.

Samples of an antitheft label which are designated by reference numeral 1 in FIGS. 1 and 2 were prepared by covering a thin amorphous metal wire 2 with two sheets 3 and 4. The wire had a diameter of 127 μm and an alloy composition of $Fe_{77.5}Si_{7.5}B_{15}$, (the subscripts denoting atomic percent). The two sheets 3 and 4 were made of both an electroconductive nonmagnetic thin metal sheet and a synthetic resin film or paper as identified in Table 1. The underside of the sheet 4 was coated with a tackifier so that it could be attached onto a sheet of release paper 5.

COMPARATIVE EXAMPLES 1 AND 2

Comparative samples of an antitheft label were prepared as in Examples 1 to 16 except that the thin amorphous metal wire 2 was covered with either two synthetic resin films or both a synthetic resin film and paper as identified in Table 1.

TABLE 1

| | Sheet 3 | | Sheet 4 | |
|---|---|---|---|---|
| | Material | Thickness, μm | Material | Thickness, μm |
| Example | | | | |
| 1 | Polyester film | 25 | Aluminum foil | 7 |
| 2 | Polyester film | 25 | Aluminum foil | 50 |
| 3 | Paper | 50 | Aluminum foil | 7 |
| 4 | Paper | 50 | Aluminum foil | 50 |

TABLE 1-continued

| | Sheet 3 | | Sheet 4 | |
|---|---|---|---|---|
| | Material | Thickness, μm | Material | Thickness, μm |
| 5 | Aluminum foil | 7 | Polyester film | 25 |
| 6 | Aluminum foil | 50 | Polyester film | 25 |
| 7 | Aluminum foil | 7 | Paper | 50 |
| 8 | Aluminum foil | 50 | Paper | 50 |
| 9 | Polyester film | 25 | Copper foil | 10 |
| 10 | Polyester film | 25 | Copper foil | 50 |
| 11 | Paper | 50 | Copper foil | 10 |
| 12 | Paper | 50 | Copper foil | 50 |
| 13 | Copper foil | 10 | Polyester film | 25 |
| 14 | Copper foil | 50 | Polyester film | 25 |
| 15 | Copper foil | 10 | Paper | 50 |
| 16 | Copper foil | 50 | Paper | 50 |
| Comparative Example | | | | |
| 1 | Polyester film | 25 | Polyester film | 25 |
| 2 | Paper | 50 | Polyester film | 25 |

Each of the samples of the antitheft labels was placed in a microwave oven (24.5 MHz) together with 500 g of meat and illuminated with microwaves from a vacuum tube (magnetron) to check for the occurrence of spark discharge. The results are shown in Table 2.

TABLE 2

| Example | Spark Discharge |
|---|---|
| 1 | Absent |
| 2 | " |
| 3 | " |
| 4 | " |
| 5 | " |
| 6 | " |
| 7 | " |
| 8 | " |
| 9 | " |
| 10 | " |
| 11 | " |
| 12 | " |
| 13 | " |
| 14 | " |
| 15 | " |
| 16 | " |

TABLE 2-continued

| Comparative Example | Spark Discharge |
|---|---|
| 1 | Present (spark discharge occurred 10 to 20 sec after the start of operation) |
| 2 | Present (spark discharge occurred 10 to 20 sec after the start of operation) |

As is clear from Table 2, the samples of antitheft label that were prepared in Examples 1 to 16 by covering the thin amorphous metal wire with both a conductive nonmagnetic thin metal sheet and a synthetic resin film or paper did not produce spark discharge even when they were illuminated with microwaves in a microwave oven.

However, the comparative samples which were prepared by covering the thin amorphous metal wire with either two synthetic resin films or both a synthetic resin film and paper produced spark discharge when they were illuminated with microwaves in a microwave oven.

EXAMPLES 17 TO 32

Additional samples of the antitheft label designated by 1 in FIGS. 1 and 2 were prepared by covering a thin amorphous metal wire 2 with two sheets 3 and 4. The wire had a diameter of 127 μm and an alloy composition of $Fe_{77.5}Si_{7.5}B_{15}$ (the subscripts denote atomic percent). The two sheets 3 and 4 were made of both an electroconductive nonmagnetic thin metal sheet and a synthetic resin film or paper as identified in Table 3. The radii of curvature of the respective conductive nonmagnetic thin metal sheets were also measured. The underside of the sheet 4 was coated with a tackifier so that it could be attached onto a sheet of release paper 5.

TABLE 3

| | Sheet 3 | | Sheet 4 | | Curvature radius of the |
|---|---|---|---|---|---|
| Example No. | Material | Thickness, μm | Material | Thickness, μm | corners of conductive nonmagnetic metal member |
| 17 | Polyester film | 25 | Aluminum foil | 7 | 15.0 |
| 18 | Polyester film | 25 | Aluminum foil | 7 | 10.0 |
| 19 | Polyester film | 25 | Aluminum foil | 7 | 5.0 |
| 20 | Polyester film | 25 | Aluminum foil | 7 | 2.5 |

TABLE 3-continued

| Example No. | Sheet 3 Material | Sheet 3 Thickness, μm | Sheet 4 Material | Sheet 4 Thickness, μm | Curvature radius of the corners of conductive nonmagnetic metal member |
|---|---|---|---|---|---|
| 21 | Polyester film | 25 | Aluminum foil | 7 | 1.0 |
| 22 | Polyester film | 25 | Aluminum foil | 7 | 0.3 |
| 23 | Paper | 25 | Aluminum foil | 50 | 2.5 |
| 24 | Aluminum foil | 50 | Polyester film | 25 | 2.5 |
| 25 | Aluminum foil | 7 | Paper | 50 | 2.5 |
| 26 | Polyester film | 25 | Copper foil | 10 | 2.5 |
| 27 | Paper | 50 | Copper foil | 50 | 5.0 |
| 28 | Paper | 50 | Copper foil | 50 | 2.5 |
| 29 | Paper | 50 | Copper foil | 50 | 1.0 |
| 30 | Paper | 50 | Copper foil | 50 | 0.3 |
| 31 | Copper foil | 50 | Polyester film | 25 | 2.5 |
| 32 | Copper foil | 10 | Paper | 50 | 2.5 |

Each of the samples of the antitheft label was put in a microwave oven (24.5 MHz) together with 50 g of meat and illuminated with microwaves from a vacuum tube (magnetron) to check for the occurrence of spark discharge. The results are shown in Table 4.

TABLE 4

| Example | Spark Discharge |
|---|---|
| 17 | Absent |
| 18 | " |
| 19 | " |
| 20 | " |
| 21 | " |
| 22 | " |
| 23 | " |
| 24 | " |
| 25 | " |
| 26 | " |
| 27 | " |
| 28 | " |
| 29 | " |
| 30 | " |
| 31 | " |
| 32 | " |

As is clear from Table 4, the samples of Examples 17 to 32 in which the thin amorphous metal wire was covered with both a conductive nonmagnetic thin metal sheet and a synthetic resin film or paper and in which the corners of the conductive nonmagnetic thin metal sheet had curvature radii of at least 0.3 mm did not produce spark discharge even when only 50 g of meat was put in the microwave oven.

EXAMPLE 33

FIG. 3 is a sectional view of a commercial pad for absorbing gravy. In Example 33, an absorptive pad having an antitheft label for use on food was constructed; the pad was of the type indicated by reference numeral 11 in FIG. 4. First, the antitheft label was prepared by attaching a thin amorphous metal wire 2 and a conductive nonmagnetic metal member 3 to a synthetic resin film 4 and fixing them in position. The wire had a diameter of 127 μm and an alloy composition of $Fe_{77.5}Si_{7.5}B_{15}$ (the subscripts denote atomic percent). The conductive nonmagnetic metal member 3 was composed of an aluminum foil as a conductive nonmagnetic thin metal sheet that was laminated with a polyester film. Tackifier AP-6903 (H. B. Fuller Co. U.S.A.) was coated onto the conductive nonmagnetic metal member 3 so that the soft magnetic metal strip 2 could be fixed in position. Thereafter, the side of the metal member 3 which was coated with the tackifier was attached to the synthetic resin film 4, whereby both the soft magnetic metal strip 2 and the conductive nonmagnetic metal member 3 were fixed onto the synthetic resin film 4. The synthetic resin film 4 was a polyester film 16 μm thick.

Each of the upper and lower tapes 6 and 7 in the pad 11 was made from a polyethylene film. The upper tape 6 was coated with a hot-melt adhesive (Sumitomo 3M, Ltd.) and the side of the antitheft label where the conductive nonmagnetic metal member 3 was exposed was adhered to the inner side of the upper tape 6.

A short-fiber pulp sheet 8 was placed over the lower tape 7 and fixed in position. Thereafter, the upper tape 6 was superposed on the lower tape 7 and the assembly was heat sealed on the four sides to produce the absorptive pad 11 for use on food that was equipped with the antitheft label.

The thus produced pad 11 was put in a microwave oven (24.5 MHz) together with 500 g of meat and illuminated with microwaves from a vacuum tube (magnetron) to check for the occurrence of spark discharge. As it turned out, the label did not produce spark discharge and the absorptive pad to which the label was attached remained totally intact (i.e., it did not suffer from any fire damage).

What is claimed is:

1. An absorptive pad for absorbing fluids flowing from food, comprising:

a lower tape having a plurality of holes passing therethrough;

an absorptive sheet disposed on said lower tape;

an upper tape superposed on said lower tape so that said absorptive sheet is positioned therebetween; and an antitheft label interposed between said upper tape and said absorptive sheet and attached to at least one of said upper tape and said lower tape, said antitheft label comprising an electroconductive nonmagnetic metal member permanently applied to a magnetic metal strip, wherein said electroconductive nonmagnetic metal member is shaped so as to include a plurality of corners, each of said corners of said electroconductive nonmagnetic metal member having a radius of curvature which is greater than or equal to 0.3 mm, wherein edges of said magnetic metal strip do not extend beyond edges of said electroconductive nonmagnetic metal member.

* * * * *